(12) United States Patent
Bowen

(10) Patent No.: US 8,157,072 B2
(45) Date of Patent: Apr. 17, 2012

(54) TRANSFER CASE WITH CLUTCH ACTUATOR

(75) Inventor: Thomas C. Bowen, Rochester Hills, MI (US)

(73) Assignee: Hyundai Wia Corporation (KR)

( * ) Notice: Subject to any disclaimer, the term of this patent is extended or adjusted under 35 U.S.C. 154(b) by 771 days.

(21) Appl. No.: 11/774,588

(22) Filed: Jul. 7, 2007

(65) Prior Publication Data

US 2009/0008206 A1 Jan. 8, 2009

(51) Int. Cl.
*B60K 23/08* (2006.01)

(52) U.S. Cl. ............. 192/70.23; 192/99 S; 192/99 R; 192/84.6; 192/84.7; 180/247; 74/665 F

(58) Field of Classification Search .............. 192/70.3, 192/99 S
See application file for complete search history.

(56) References Cited

U.S. PATENT DOCUMENTS

| | | | |
|---|---|---|---|
| 3,400,610 A * | 9/1968 | Taylor et al. ............. 475/150 |
| 4,650,056 A | 3/1987 | Sevennec et al. |
| 4,895,236 A | 1/1990 | Sakakibara et al. |
| 4,976,347 A | 12/1990 | Sakakibara et al. |
| 5,332,060 A | 7/1994 | Sperduti et al. |
| 5,867,092 A | 2/1999 | Vogt |
| 5,878,624 A | 3/1999 | Showalter et al. |
| 6,079,535 A | 6/2000 | Mueller et al. |
| 6,099,430 A | 8/2000 | Winks |
| 6,446,778 B1 * | 9/2002 | Cole et al. ............. 192/98 |
| 6,645,109 B2 | 11/2003 | Williams et al. |
| 6,651,793 B2 | 11/2003 | Reisinger |
| 6,780,132 B2 | 8/2004 | Cook et al. |
| 6,802,794 B2 | 10/2004 | Showalter |
| 6,824,487 B2 | 11/2004 | Williams et al. |
| 6,848,550 B2 | 2/2005 | Puiu et al. |
| 7,032,733 B2 | 4/2006 | Parigger |
| 7,101,304 B2 | 9/2006 | Swanson et al. |
| 7,111,716 B2 | 9/2006 | Ekonen et al. |
| 7,338,403 B2 * | 3/2008 | Puiu ............. 475/223 |
| 2003/0047406 A1 * | 3/2003 | Szadkowski et al. ...... 192/70.25 |

* cited by examiner

*Primary Examiner* — David D Le
*Assistant Examiner* — Ryan Dodd
(74) *Attorney, Agent, or Firm* — Park & Associates IP Law, P.C.

(57) ABSTRACT

A transfer case for selectively coupling a secondary driveline with a primary driveline comprises: a first output shaft; a second output shaft; a clutch assembly disposed at the second output shaft, the clutch assembly including inner and outer drum members, one of the inner and outer drum members rotatable in association with rotation of the first output shaft and the other one of the inner and outer drum members coupled with the second output shaft, the clutch assembly further including a plurality of frictional clutch plates, the frictional clutch plates formed of at least one frictional clutch plate coupled with the inner drum member and at least one frictional clutch plate coupled with the outer drum member; an actuator shaft rotatably coupled with an actuator; and a clutch actuator means coupled with the actuator for applying axial force to the frictional clutch plates to transmit a drive torque of the first output shaft to the second output shaft. The clutch actuator means can be a pivot lever pivotally moveable in association with rotation the actuator shaft coupled with the actuator for said applying the axial force to the frictional clutch plates, or can be a sliding lever moveable in an axial direction of the actuator shaft in association with rotation the actuator shaft coupled with the actuator.

10 Claims, 4 Drawing Sheets

TRANSFER CASE WITH CLUTCH ACTUATOR

FIELD OF THE INVENTION

The present invention relates to a power transfer system, and more particularly, to a transfer case for four-wheel drive vehicles, the transfer case having an electric actuator for applying forces to a clutch mechanism in order to couple the secondary driveline to the primary driveline of the vehicle.

BACKGROUND OF THE INVENTION

Many modern vehicles, in particular sport utility vehicles and light trucks, are equipped with a four-wheel drive system to improve traction, which comprises a transfer case for interconnecting and also distributing power between the primary and secondary drivelines to cause the vehicle to drive in a four-wheel drive condition. Such four-wheel drive vehicles are equipped with a transfer case, which receives drive torque from the transmission of the vehicle and connects or distributes the power between the primary driveline for driving a first set of wheels (for example, the rear wheels) and the secondary driveline for driving a second set of wheels (for example, the front wheels).

Depending on the particular four wheel drive systems, the engagement of four wheel drive mode may be manually controlled by selection of the four-wheel drive mode by the operator, or it can be automatically controlled by an electronic control system upon detection of adverse road conditions, such as a low traction condition when driving on slippery road surfaces or when driving off road.

Certain transfer cases used for manual shift drive systems or automatic control drive systems (such as "on-demand" control systems) use a multiple plate clutch to transmit torque. The clutch is actuated by a mechanical, magnetic, or hydraulic mechanism.

In a conventional transfer case, such as those equipped with manual four wheel drive selection, the front wheels are typically engaged with a synchronizer that has splined teeth to transmit the drive torque. The synchronizer is usually moved into engagement by an electric motor. This design has some merits since the system can be made with relatively low cost.

However, one primary drawback recognized with this design is the possibility of malfunction or inability in releasing from the four-wheel drive engagement, particularly when the system is subject to torque load. The synchronizer spline teeth will engage with no torque load, but friction on the spline teeth will often prevent them from disengagement if they are transmitting high torque. Thus, even if the driver selects the two-wheel drive mode, the synchronizer often remains in a locked condition of the four-wheel drive mode. If the secondary wheels (e.g., the front wheels) remain engaged when driving on regular roads, the difference between front and rear wheel speeds will produce destructive torque in the driveline of the vehicle. This stress may build up in the driveline until the system has a torque reversal that will let the synchronizer release, or otherwise some parts in the driveline may be damaged or break.

SUMMARY OF THE INVENTION

In order to solve the above described drawbacks and other problems of the conventional transfer case to be recognized by following disclosure, the present invention provides a new and useful transfer case and its actuating system for applying force to a clutch, which enables reliable engagement and disengagement of the four-wheel drive mode without malfunctions. The mode shift can be made by selection of the operator or otherwise automatically engaged on demand in order to drive and release the secondary wheels.

The present invention also provides a useful transfer case and its actuating system which utilizes an electric actuator, such as an electrically actuated or controlled motor, to actuate the clutch. The electric motor of the system can be provided with relatively low cost in comparison to the conventionally-used hydraulic actuators which also make the control system more complicated and expensive. In addition, the electric motor of the invention, typically for the manual selection system, can be selected from the same or similar low cost actuator motors currently used for the conventional synchronizer. Also, because the actuator system of the invention uses a power increasing mechanism such as a rotary cam and a pivoting lever mechanism, the drive torque of the electric motor is multiplied to effectively actuate the clutch with a relatively low torque motor.

The actuation system of the invention may also be applied for an automatic on-demand system by utilizing a more powerful electric motor and adding the necessary control systems such as a computerized controller and vehicle sensors. In addition, because the torque transmitted by the clutch is a direct function of the force applied to the clutch plates of the clutch, the actuation system of the invention may also be utilized to limit or control drive torque.

According to one aspect of the invention, a transfer case for selectively coupling a primary driveline with a secondary driveline comprises: a first output shaft (e.g., a rear output shaft); a second output shaft (e.g., a front output shaft); a clutch assembly disposed at the second output shaft, the clutch assembly including inner and outer drum members, one of the inner and outer drum members (e.g., the outer drum member) being rotatable in association with rotation of the first output shaft and the other one of the inner and outer drum members (e.g., the inner drum member) coupled with the second output shaft, the clutch assembly further including a plurality of frictional clutch plates, the frictional clutch plates formed of at least one frictional clutch plate coupled with the inner drum member and at least one frictional clutch plate coupled with the outer drum member; an actuator shaft rotatably coupled with an actuator (e.g., an electric motor); and a clutch actuator means coupled with the actuator for applying axial force to the frictional clutch plates to transmit a drive torque of the first output shaft to the second output shaft.

In one preferred embodiment, the clutch actuator means is a pivot lever pivotally moveable in association with rotation the actuator shaft coupled with the actuator for said applying the axial force to the frictional clutch plates. In another preferred embodiment, the clutch actuator means is a sliding lever moveable in an axial direction of the actuator shaft in association with rotation the actuator shaft coupled with the actuator. The transfer case preferably comprises a chain for rotating the outer drum member in association with said rotation of the first output shaft. According to the present invention, the torque of the electric motor is effectively magnified by the rotary cam and the lever mechanism (e.g., the pivot lever) to effectively apply suitable axial force to the clutch. The force magnifying rate can be varied depending on the design and configuration of the rotary cam and the pivot lever and to meet the requirement of the particular four wheel drive system of the vehicle. The force may be further magnified by another lever (e.g., a clutch lever) disposed in the clutch with a thrust bearing interposed between this lever and the pivot lever of the actuator.

According to another aspect of the invention, a transfer case comprises: a first output shaft; a second output shaft; a clutch assembly disposed at the second output shaft, the clutch assembly including inner and outer drum members, one of the inner and outer drum members rotatable in association with rotation of the first output shaft and the other one of the inner and outer drum members coupled with the second output shaft, the clutch assembly further including a plurality of frictional clutch plates, the frictional clutch plates formed of at least one frictional clutch plate coupled with the inner drum member and at least one frictional clutch plate coupled with the outer drum member; an actuator shaft rotatably coupled with an electric actuator; and a pivot lever, one end of the pivot lever coupled with the actuator shaft for pivotally moving the pivot lever in association with rotation the actuator shaft, another end of the pivot lever configured to apply axial force to the frictional clutch plates to transmit a drive torque of the first output shaft to the second output shaft. The transfer case preferably comprises a thrust bearing and a clutch lever serially disposed between the pivot lever and the frictional clutch plates for pressing the frictional clutch plates upon pivotal movement of the pivot lever.

According to another aspect of the invention, a transfer case comprises: a first output shaft; a second output shaft; a clutch assembly disposed at the second output shaft, the clutch assembly including inner and outer drum members, one of the inner and outer drum members rotatable in association with rotation of the first output shaft and the other one of the inner and outer drum members coupled with the second output shaft, the clutch assembly further including a plurality of frictional clutch plates, the frictional clutch plates formed of at least one frictional clutch plate coupled with the inner drum member and at least one frictional clutch plate coupled with the outer drum member; an actuator shaft rotatably coupled with an electric actuator; and a sliding lever, the sliding lever including a sliding member coupled with the actuator shaft for moving the sliding lever in an axial direction in association with rotation the actuator shaft, and an annular actuator portion disposed at an opposing end from the sliding member, the annular actuator portion of the sliding lever configured to apply axial force to the frictional clutch plates to transmit a drive torque of the first output shaft to the second output shaft. The transfer case preferably comprises a thrust bearing and a clutch lever serially disposed between the sliding member and the frictional clutch plates for pressing the frictional clutch plates upon axial movement of the sliding lever.

BRIEF DESCRIPTION OF THE DRAWINGS

The above described and other objects, features and advantages of the present invention will be more apparent from the presently preferred embodiments of the invention disclosed in the following description and illustrated in the accompanying drawings, in which.

DETAILED DESCRIPTION OF THE INVENTION

Preferred embodiments of the present invention are described herein with reference to the drawings. The power transfer system and its actuator system of the invention may be applied for a manual selection type or also for an automatic on-demand system.

Figure 1:
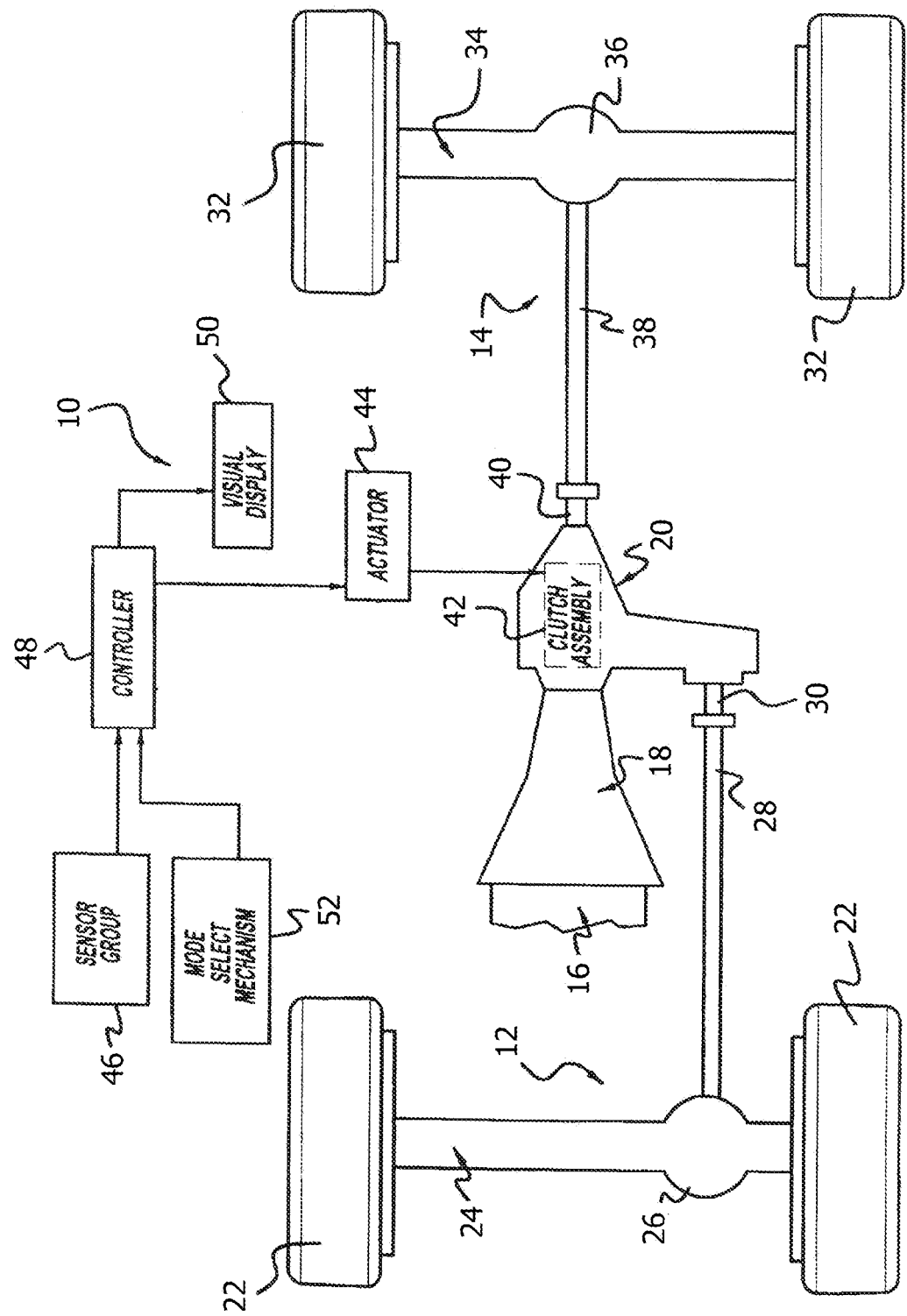
FIG. 1 is a schematic representation of a four-wheel drive motor vehicle equipped with the power transfer systems of the present invention.

Referring to FIG. 1 of the drawings, a drivetrain for a four-wheel drive vehicle is schematically shown, which is interactively associated with a power transfer system 10 of the present invention. The vehicle drivetrain includes a front driveline 12 (typically a secondary driveline) and a rear driveline 14 (typically a primary driveline) both drivable from a source of power, such as an engine 16, through a transmission 18 which may be of either the manual or automatic type.

In the exemplary embodiment shown, the drivetrain includes a transfer case 20 for transmitting drive torque from engine 16 and transmission 18 to front driveline 12 and rear driveline 14. Front driveline 12 includes a pair of front wheels 22 connected at opposite ends of a front axle assembly 24 having a front differential 26 that is coupled to one end of a front drive shaft 28, the opposite end of which is coupled to a front output shaft 30 of transfer case 20. Similarly, rear driveline 14 includes a pair of rear wheels 32 connected at opposite ends of a rear axle assembly 34 having a rear differential 36 coupled to one end of a rear drive shaft 38, the opposite end of which is interconnected to a rear output shaft 40 of transfer case 20. As will be detailed hereinafter with greater specificity, transfer case 20 is equipped with an electronically-controlled clutch 42 that is operable to connect or disconnect the primary and secondary drivelines and also to control the magnitude of speed differentiation and torque distribution between output shafts 30 and 40.

Power transfer system 10 further includes a power-operated actuator assembly 44 for actuating the clutch 42. It may further include a sensor group 46 for sensing specific dynamic and operational characteristics of the motor vehicle and generating sensor input signals indicative thereof, and a controller 48 for generating control signals in response to the sensor input signals. Moreover, controller 48 is adapted to control the actuated condition of mode clutch 42 by sending control signals to actuator assembly 44. As is schematically shown, controller 48 is also operable for presenting to the vehicle operator a visual indication of the operational status of power transfer system 10 at a visual display 50 located within the passenger compartment.

Power transfer system 10 also includes a mode select mechanism 52 for permitting the vehicle operator to select one of the available drive modes. In particular, controller 48 controls actuator assembly 44 in response to a mode signal sent to controller 48 from mode select mechanism 52 that is indicative of the particular mode selected. When an on-demand or adaptive four-wheel drive mode is selected, controller 48 operates to continuously monitor and automatically regulate the actuated condition of mode clutch 42 between its non-actuated and fully-actuated limits for varying the magnitude of speed differentiation and torque transfer between output shafts 30 and 40. However, when the mode signal indicates that a manual or "locked" four-wheel drive mode has been selected, mode clutch 42 is fully actuated, whereby non-differentiated power is delivered to output shafts 30 and 40. The locked four-wheel drive mode is provided for permitting improved traction when the vehicle is operated off-road or on severe road conditions.

Figure 2:
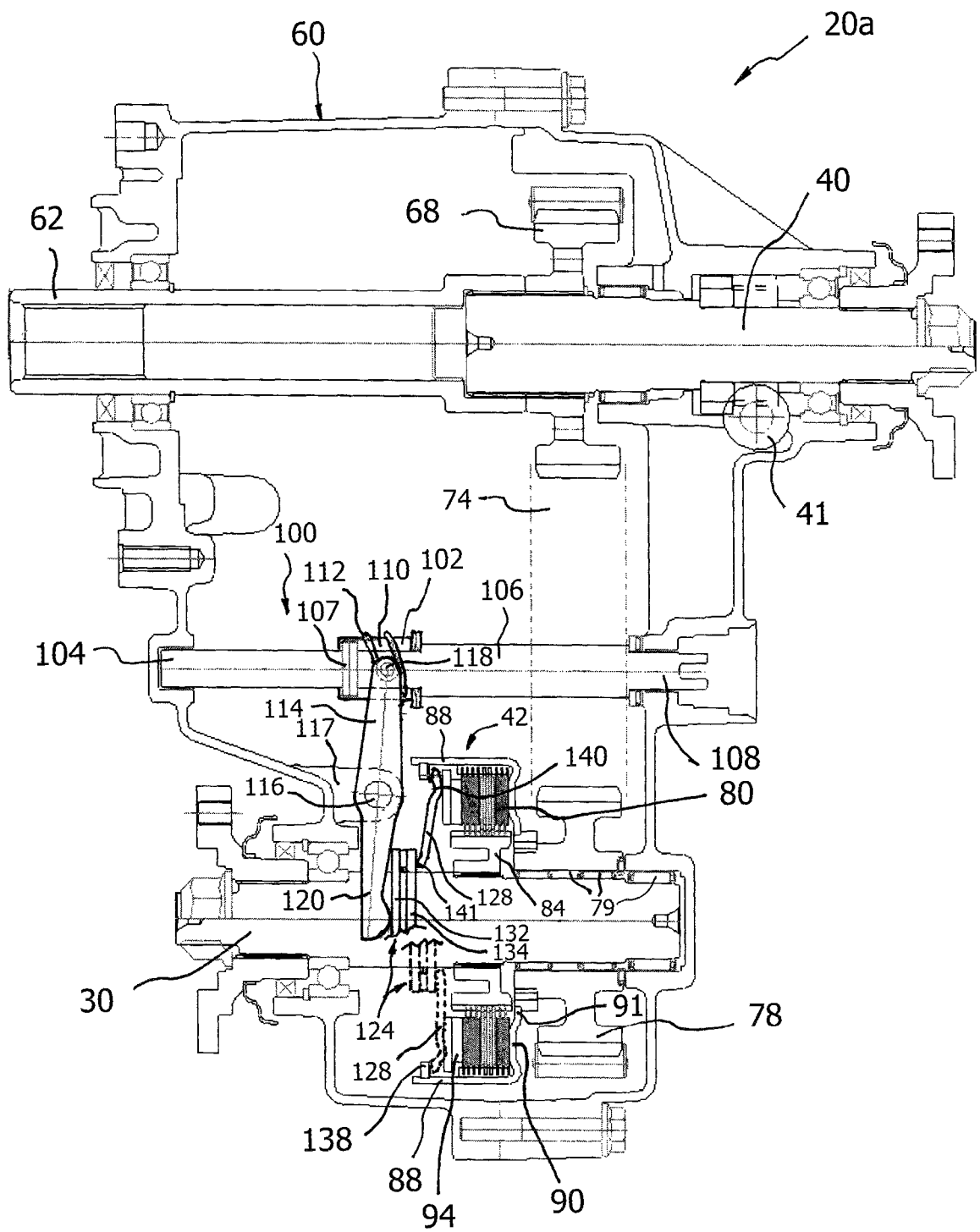
FIG. 2 shows a side cross-sectional view of the transfer case according to one preferred embodiment of the present invention.

Referring now to FIG. 2, one preferred embodiment for a transfer case 20a is described herein. Transfer case 20a includes a housing assembly 60 configured in a suitable container shape and an input shaft 62 rotatably supported at housing assembly 60. Input shaft 62 is adapted for connection to an output shaft (not shown) of transmission 18 such that they both are rotatably driven by engine 16 of the motor vehicle. As seen, rear output shaft 40 is rotatably supported between input shaft 62 and housing assembly 60 while front output shaft 30 is rotatably supported from housing assembly 60 with bearings or rollers engaged therein. Transfer case 20a may also include a speed detection means such as a speedometer 41 for sensing and controlling the rotational speed of the output shaft 40, a reduction gear or planetary gear assembly (not shown), various bearing means, and other structural or functional mechanisms (not shown) such as a mode shift or synchronized range shift mechanism, a clutch means, and an inter-axle differential known in the art. For example, as known in the transfer case fields, such a planetary gear assembly may include one or more ring gear, one or more sun gear fixed for rotation with input shaft, and a set of pinion gears which are each rotatably supported on a pinion shaft and meshed with the sun gear and ring gear with various gear shift or reduction arrangements available.

Transfer case 20a also includes a chain sprocket 68 rotatably supported on rear output shaft 40, which is adapted to rotate chain 74 and also transmit the rotational torque to a driven sprocket 78 (which is freely rotating on the front output shaft 30 with roller bearings 79 engaged there-between) in order to selectively or controllably transfer the rotational torque of the rear output shaft 40 to front output shaft 30 in association with operation of the clutch assembly 42. Clutch assembly 42 includes clutch plates 80 composed of a first set of clutch plates splined at an outer circumference of inner drum 84, which is in turn splined at the front output shaft 30, and a second set of clutch plates splined at an inner circumference of outer drum 88 which is rotatably coupled with the driven sprocket 78 and also alternately interleaved with the first set of clutch plates for frictionally transmitting the torque. In the embodiment as shown, the outer drum 88 includes an open end and a partially closed end with annular flange portion 90 extending in a radially inward direction from the partially closed end of the outer drum 88, and the inner circumference 91 of the annular flange portion 90 is coupled to the driven sprocket 78 for rotating together. The interleaved clutch plates 80 are positioned adjacent to the annular flange portion 90 of the outer drum 88 in a manner abutting against the annular flange portion 90. Accordingly, when the clutch plates are pressed against the flange portion 90 by press plate 94 in a manner to be described later, the chain driven rotation of the sprocket 78 and outer drum 88 is transmitted to the inner drum 84 and to the front output shaft 30 via the frictional engagement of the interleaved clutch plates 80, thus enabling the four wheel drive actuation.

With continued reference to FIG. 2, the mode shift or actuation mechanism associated with the transfer case of the present embodiment further includes a rotary cam assembly 100 which is rotatably disposed in the transfer case housing 60. Rotary cam assembly 100 includes rotary cam member 102 of generally cylindrical or other suitable shape, which is fixed at an intermediate location of an actuator shaft 106 with pin 107. The actuator shaft 102 is installed preferably in parallel with the front and rear output shaft 30 and 40 and also with the central axis of clutch 42 as shown. The actuator shaft 106 has terminal ends 104 and 108 rotatably supported at the wall of the housing 60, with the end 108 coupled with an actuator 44 (FIG. 1), such as an electrically controlled motor, for rotating the cam assembly 100. A cam groove 110 of suitable dimension is disposed at the cylindrical surface of the rotary cam member 102, preferably between two parallel helical teeth or ridges 112 of predetermined helical slope, for cam operation upon rotation of the cam member 102. The rotary cam member can have other shapes different from the rotary cam 102 shown in FIG. 2. For example, it has a generally cylindrical shape with a cam slot of predetermined slope formed through a side wall of the cylindrical cam for receiving a cam follower or cam pin of pivot lever 114 to be described below. For another example, it can be a conventional ball screw feeder structure that includes an actuator shaft having helical screws (similar to the rotary cam 102) formed thereon, a cylindrical ball socket having an axial opening with ball bearings arranged therein and received between the helical screws for providing friction-reduced feeding of the ball socket, and a pivot lever (similar to the pivot lever 114) pivotally fixed at the outer ball socket for pivotally moving the pivot lever upon rotation of the actuator shaft.

With continued reference to FIG. 2, pivot lever or fork 114 is coupled with the rotary cam assembly 100 for applying compressing force to the press plate 94 received in the outer drum 88 for the clutch engagement described above. More particularly, pivot lever 114 has an elongated bar or finger-like shape with a pivot pin 116 disposed at an intermediate location of the lever 114. The pivot pin 116 is fixed at hinge plate 117 extending from the housing 60, or otherwise directly at opposing walls of the housing 60, and causes the lever 114 to rotate about the pin 116.

A proximal end of the lever 114 is provided with roller contact or cam follower 118 for engaging with the cam groove 110 of the rotary cam member 102. A distal end of the lever 114 is preferably bifurcated and defines two fingers 120 configured to contact with two diametrically opposing sides at stationary bearing ring 132 of annular-shaped thrust bearing assembly 124, with the contact pressure applying in the axial direction of the front output shaft 30. Rear bearing ring 134 of the trust thrust bearing assembly 124 can be rotated relative to the stationary bearing ring 132 with roller bearings rotatably engaged there-between. This configuration provides effective and friction-reduced operation of the clutch actuation mechanism even under the influence of the rotating outer drum 88 for the clutch activation. In addition, due to the bifurcated fingers 120, the front output shaft 30 can rotate without interference within the inner space defined between the bifurcated fingers 120.

In addition, the pivot lever 114 is installed in the housing generally perpendicular to the actuator shaft 106 and the front output shaft 30 as shown. By this arrangement, the distal contact portion of the fingers 120 can apply the clutch actuating force on the thrust bearing assembly 124 generally in a direction parallel with the front output shaft 30, thus pushing the thrust bearing 124 (and clutch lever 128 to be described below) in the axial direction of the front output shaft 30 to effect the clutch operation.

Clutch assembly 42 preferably includes one or more clutch lever 128 interposed between the annular thrust bearing assembly 124 and the pressure plate 94 of the clutch assembly 42. The clutch lever 128 has a bent contact portion 140 at an outer location of the lever. Snap member 138 is installed in an inner open end surface of the outer drum 88 to retain the clutch lever 128 in the drum 88 with the bent contact portion 140 of lever 128 generally abutting against the outer surface of the pressure plate 94. In an alternative embodiment, the clutch lever 128 may be omitted and the rear ring 134 includes a diametrically extended member to directly press and contact against the pressure plate 94.

The pivot lever 114 is particularly configured to have the length from the contact roller 118 to the pivot pin 116 preferably longer than the length from the pivot pin 116 to the diametrically disposed contact points of the fingers 120. In addition, the clutch lever 128 is similarly configured to have the length from the bearing-contact inner end 141 to the bent contact 140 longer than the length from the bent contact 140 to the outer end contacting the snap ring 138. This configuration of the levers 114 and 128 associated with the cam connection at the roller contact 118 with the cam groove 110 functions to magnify the force applying to the press plate 94 of the clutch 42. Thus, the torque of the actuating motor is greatly magnified to effectively press the clutch plates. Accordingly, a relatively low cost motor, such as those used for conventional synchronizers, can be adopted for the actuator 44. By modifying the configuration and dimension of the cam connection and levers 114 and 128, for example, by changing the cam groove slope and adjusting the relative leverage positions of the levers 114 and 128, the force magnification rate of the system can effectively be adjusted to meet the operational requirements of a particular four wheel drive system of the motor vehicle. In one exemplary embodiment utilizing the same or similar configuration as shown in FIG. 2, the force is magnified about 5 to 10 times, and more particularly about 7 times.

As shown in FIG. 2, in operation, rotation of the actuator shaft 106 in one direction causes the cam engaged pivot lever 114 to pivot about the pivot shaft 116, and as a result the contact fingers 120 and the thrust bearing 124 move toward the clutch 42, which in turn applies axial pressure to the clutch lever 128 and to the pressure plate 94 for actuating the clutch assembly 42 to transfer the rotational torque of the rear output shaft 40 to the front output shaft 30 of the transfer case 20a. Conversely, when the electric motor and the actuator shaft 106 rotates in the opposite direction, the clutch lever 128, the thrust bearing 124, and the pivot lever 114 return in an opposite direction to release the actuated clutch 42. Dotted lines of FIG. 2 illustrate the clutch lever 128 and the thrust bearing 124 in their pressed position (however, without showing for the simplicity purposes the pivot lever 114 pivotally displaced towards the clutch 42), while solid lines thereof show them in their pre-pressed position.

Figure 3:
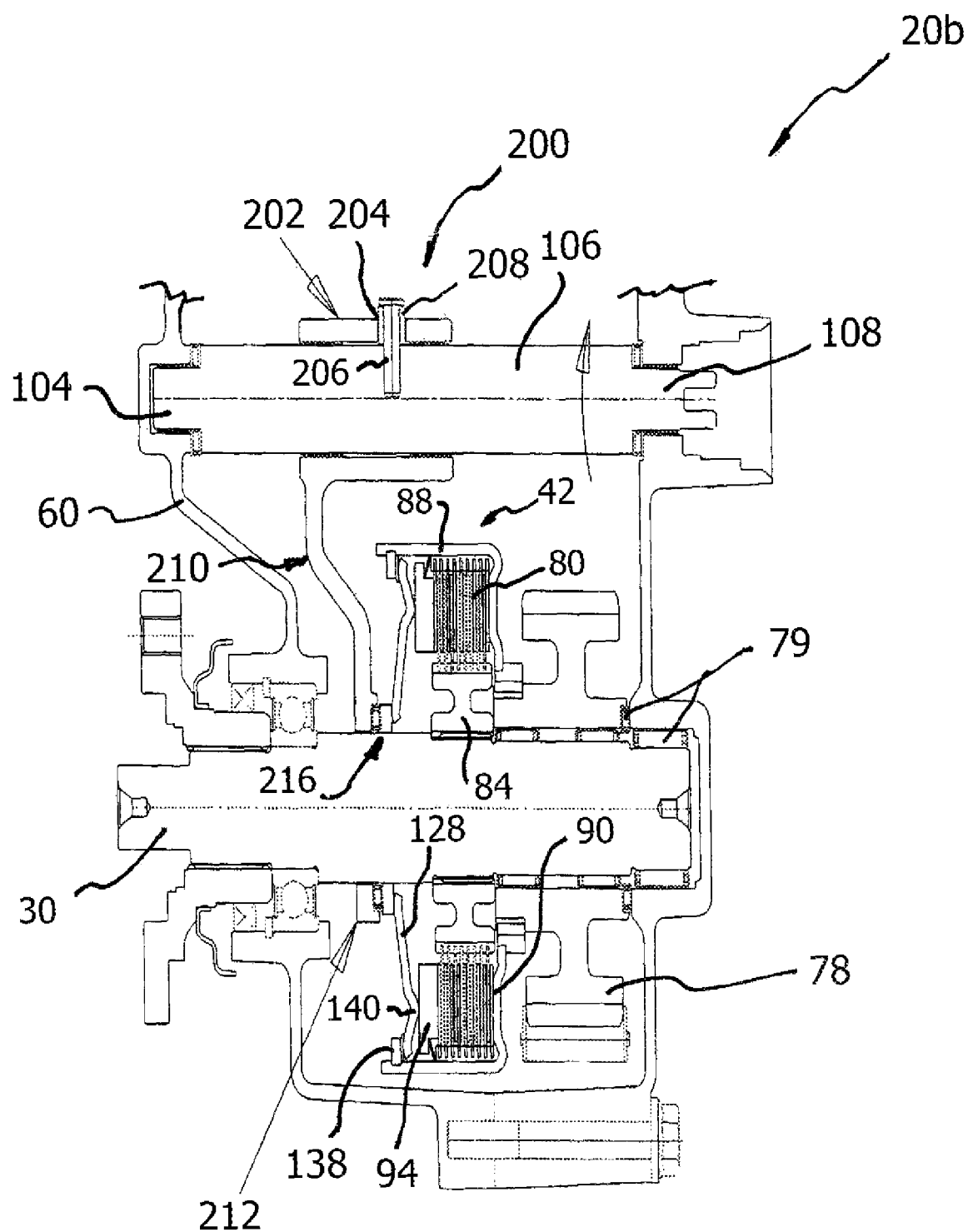
FIG. 3 shows a partial, side cross-sectional view of the transfer case according to another preferred embodiment of the present invention, illustrating only the mode shifting mechanism thereof.

FIG. 3 depicts a partial, side cross-sectional view of the transfer case according to another preferred embodiment of the present invention, which illustrates only the mode shifting or actuation mechanism thereof while omitting for simplicity purposes the upper portion of the transfer case shown in FIG. 2. Same or similar members of this embodiment are referred herein with the same or like reference numerals used in connection with FIGS. 1 and 2.

Referring to FIG. 3, transfer case 20b has a substantially similar construction to the transfer case 20a as described above and shown in FIG. 2, except those portions described herein below. For example, transfer case 20b includes housing 60, rear output shaft 40, front output shaft 30, input shaft 62, drive sprocket 68, driven sprocket 78, chain 74 engaged with the sprockets 68 and 78, clutch assembly 42, clutch lever 128, and other structural and functional elements as described in connection with FIG. 2. Accordingly, detailed descriptions of such members are not repeated herein.

Instead of the rotary cam assembly 100 associated with pivot lever 114 of FIG. 2, the clutch actuation mechanism of FIG. 3 includes a sliding lever or fork assembly 200 coupled with actuator shaft 106 rotatably supported from the housing 60. The sliding fork assembly 200 includes a sliding member 202 defining an axial opening for slidably receiving the actuator shaft 106. Cam groove 204 of suitable configuration is formed at a side of the sliding member 202, and cam pin 206 of the shaft 106 is received in the cam groove 204, preferably with roller contact or cam follower 208 engaged there-between, for moving the sliding member 202 along the axial direction upon rotation of the actuator shaft 106 by rotation of actuator 44 coupled at the end 108 of the actuator shaft. The sliding fork assembly 200 further includes an arm portion 210 extending transversely from the sliding member 202 with an actuator portion 212 disposed at an end of the arm 210 configured to press an inner end of the clutch actuator lever 128. The actuator portion 212 is preferably in an annular or ring shape, and an annular contact plate or thrust roller bearing 216 is engaged between the annular actuator portion 212 and the clutch lever 128. Clutch lever 128 and other portions of the clutch assembly 42 are constructed with similar elements as that described above in FIG. 2.

Accordingly, in operation, rotation of the actuator shaft 106 in one direction causes the arm 210 to move axially towards the clutch 42 due to the cam connection of the sliding fork assembly and it applies axial pressure to the clutch lever 128 and to the press plate 94, which in turn actuates the clutch assembly 42 to transfer the torque to the front output shaft 30 of the transfer case 20b. Conversely, when the actuator shaft 106 rotates in the opposite direction, the arm 210 moves in an opposite direction to release the actuated clutch 42.

In the exemplary embodiments described above with reference to FIGS. 2 and 3, the clutch assembly 42 and associated members thereof (such as clutch lever 128 and thrust bearing 124) are installed at the front output shaft 30 while the pivot lever 114 (FIG. 2) or the sliding lever 210 (FIG. 3) is configured to apply the axial clutch force to the clutch. However, the present invention is not limited thereto, and the clutch assembly 42 and its associated members can be installed at the rear output shaft 40 in a similar manner as they are installed at the front output shaft 30 as described above or with slight modification in their construction.

Figure 4:
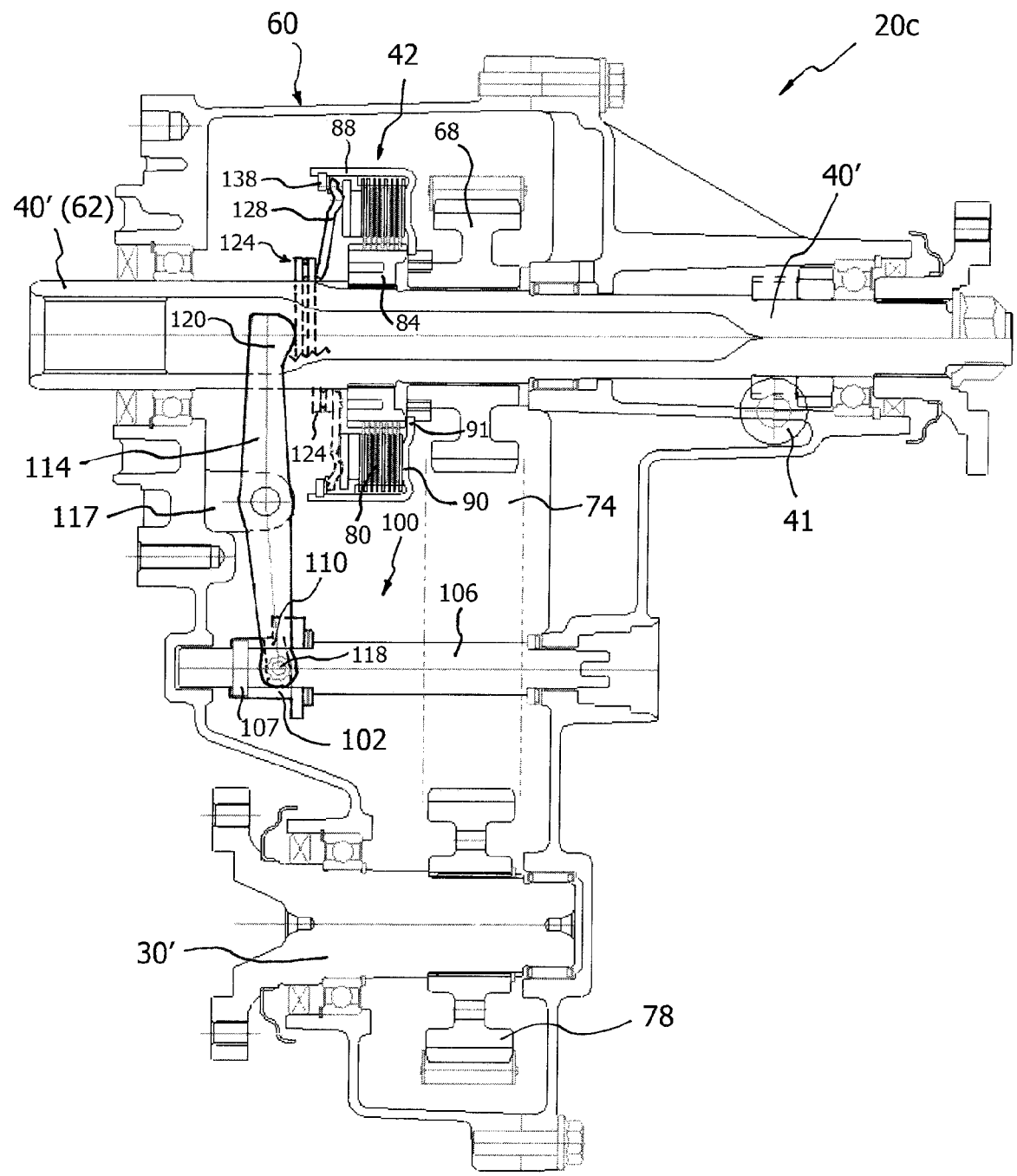
FIG. 4 shows a side cross-sectional view of the transfer case according to another preferred embodiment of the present invention.

FIG. 4 illustrates one exemplary embodiment of the transfer case in which the clutch assembly 42, clutch lever 128, and other associated members thereof are installed at the rear output shaft 40'. Referring to FIG. 4, transfer case 20c has a similar construction to the transfer case 20a as described above and shown in FIG. 2, with some exceptions to be described herein below. For example, transfer case 20c includes housing 60, rear output shaft 40' which is formed typically as a unit with input shaft 62 connected to an output shaft of transmission 18, front output shaft 30', drive sprocket 68, driven sprocket 78, chain 74 engaged with the sprockets 68 and 78, clutch assembly 42 having inner drum 84 and outer drum 88 with interleaved frictional clutch members 80 disposed there-between, clutch lever 128, and other structural and functional elements as described in connection with FIG. 2. Accordingly, detailed descriptions of such similar members are not repeated herein and to be referred above. However, in this embodiment, the inner drum 84 is supported at the rear output shaft 40' instead of the front output shaft 30' as in FIG. 2. Accordingly, in this embodiment the inner drum 84 of the clutch assembly 42 is coupled to the rear output shaft 40' and the pivot lever 114 or the sliding lever 210 is installed between the actuator shaft 106 and the rear output shaft 40' with the fingers 120 (or alternately the actuator portion 212 of FIG. 3) directing to the rear output shaft 40' to apply the axial force to the clutch 42 assembled in the rear output shaft 40'. With this arrangement, rotation of the rear output shaft 40' is selectively transmitted to the front output shaft 30' via the engaged clutch 42 and the chain 74 coupled between the chain sprockets 68 and 78, thus enabling the four wheel drive operation. FIG. 4 illustrates the alternate positions of the thrust bearing 124 and clutch lever 127 in released position (with solid lines) and in applied position (with dotted lines).

The transfer cases 20a, 20b, and 20c of the invention shown and described above are single speed type transfer cases. However, the present invention is not limited thereto, and is applicable to multiple-speed type transfer cases upon addition of suitable mechanisms thereof such as a planetary gear or reduction gear set, a range shift mechanism to shift the speed, and other functional and structural elements known in the art for constructing such multiple-speed type transfer cases. In addition, the present invention is applicable to manually applicable transfer case system which operates the four wheel connection upon the user's selection and also to on-demand or automatic power transfer systems which operate the four wheel drive operation with the aid of the controller associated with vehicle sensors as described above.

The above disclosed embodiments are representatives of a presently preferred form of the invention, but are intended to be illustrative rather than definitive thereof. Accordingly, those skilled in the art will appreciate or recognize that various modifications and substitutions can be made thereto without departing from the spirit and scope of the present invention as set forth in the appended claims.

What is claimed is:

1. A transfer case comprising:
   a first output shaft;
   a second output shaft;
   a clutch assembly disposed at the second output shaft, the clutch assembly including inner and outer drum members, the outer drum member having an open end and a partially closed end, the inner drum member coupled with the second output shaft and the outer drum member rotatable in association with rotation of the first output shaft, the clutch assembly further including a plurality of frictional clutch plates, the frictional clutch plates having at least one frictional clutch plate coupled with the inner drum member and at least one frictional clutch plate coupled with the outer drum member;
   an actuator shaft rotatably coupled with an electric actuator, the actuator shaft disposed in parallel relation with the second output shaft; and
   a pivot lever, a first end of the pivot lever coupled with the actuator shaft for pivotally moving the pivot lever in association with rotation the actuator shaft, a second end of the pivot lever configured to apply axial force to the frictional clutch plates to transmit a drive torque of the first output shaft to the second output shaft,
   wherein the transfer case further comprises a thrust bearing of annular shape which is slidably placed between the second end of the pivot lever and the clutch assembly, the thrust bearing having a central opening to which the second output shaft is received,
   wherein the second end of the pivot lever is bifurcated for pressing two diametrically opposite portions of the thrust bearing,
   wherein the pivot lever and the connection between the pivot lever and the actuator shaft are configured to magnify a drive torque of the actuator and press the thrust bearing with magnified axial force,
   wherein the clutch assembly further includes a pressure plate disposed at a lateral side of the frictional clutch plates, a snap member affixed to the open end of the outer drum member, and a plurality of clutch levers placed between the snap member and the pressure plate, an inner portion of each clutch lever configured to abut the thrust bearing and an outer portion of each clutch lever configured to abut the snap member, each clutch lever having a bent contact portion at an outer location of the clutch lever with the bent contact portion generally abutting the outer surface of the pressure plate such that said axial force of the pivot lever for applying the frictional clutch plates is further magnified by lever action of the clutch levers.

2. The transfer case of claim 1, wherein the outer drum member is rotatable in association with said rotation of the first output shaft with a chain disposed between the first and second output shafts.

3. The transfer case of claim 2, wherein the pivot lever and the connection between the pivot lever and the actuator shaft, and the clutch levers are configured to magnify the drive torque of the actuator about five to ten times to apply the axial force to the frictional clutch plates.

4. The transfer case of claim 1, wherein the pivot lever includes a cam follower at the proximal end portion of the pivot lever, the cam follower received in a cam groove of the actuator shaft, and the distal end portion of the pivot lever is configured to press the thrust bearing upon the pivotal movement of the pivot lever.

5. The transfer case of claim 1, wherein the actuator is an electric motor.

6. A transfer case comprising:
   a first output shaft;
   a second output shaft;
   a clutch assembly disposed at the first output shaft, the clutch assembly including inner and outer drum members, the outer drum member having an open end and a partially closed end, the inner drum member coupled with the first output shaft and the outer drum member rotatable in association with rotation of the second output shaft, the clutch assembly further including a plurality of frictional clutch plates, the frictional clutch plates having at least one frictional clutch plate coupled with the inner drum member and at least one frictional clutch plate coupled with the outer drum member;
   an actuator shaft rotatably coupled with an electric actuator, the actuator shaft disposed in parallel relation with the first output shaft; and
   a pivot lever, a first end of the pivot lever coupled with the actuator shaft for pivotally moving the pivot lever in association with rotation the actuator shaft, a second end of the pivot lever configured to apply axial force to the frictional clutch plates to transmit a drive torque of the first output shaft to the second output shaft,
   wherein the transfer case further comprises a thrust bearing of annular shape which is slidably placed between the second end of the pivot lever and the clutch assembly, the thrust bearing having a central opening to which the first output shaft is received,
   wherein the second end of the pivot lever is bifurcated for pressing two diametrically opposite portions of the thrust bearing,
   wherein the pivot lever and the connection between the pivot lever and the actuator shaft are configured to magnify a drive torque of the actuator and press the thrust bearing with magnified axial force,
   wherein the clutch assembly further includes a pressure plate disposed at a lateral side of the frictional clutch plates, a snap member affixed to the open end of the outer drum member, and a plurality of clutch levers placed between the snap member and the pressure plate, an inner portion of each clutch lever configured to abut the thrust bearing and an outer portion of each clutch lever configured to abut the snap member, each clutch lever having a bent contact portion at an outer location of the clutch lever with the bent contact portion generally abutting the outer surface of the pressure plate such that said axial force of the pivot lever for applying the frictional clutch plates is further magnified by lever action of the clutch levers.

7. The transfer case of claim 6, wherein the outer drum member is rotatable in association with said rotation of the second output shaft with a chain disposed between the first and second output shafts.

8. The transfer case of claim 7, wherein the pivot lever and the connection between the pivot lever and the actuator shaft, and the clutch levers are configured to magnify the drive torque of the actuator about five to ten times to apply the axial force to the frictional clutch plates.

9. The transfer case of claim 6, wherein the pivot lever includes a cam follower at the proximal end portion of the pivot lever, the cam follower received in a cam groove of the actuator shaft, and the distal end portion of the pivot lever is configured to press the thrust bearing upon the pivotal movement of the pivot lever.

10. The transfer case of claim 6, wherein the actuator is an electric motor.

\* \* \* \* \*